(12) United States Patent
Tiirola et al.

(10) Patent No.: US 10,756,870 B2
(45) Date of Patent: Aug. 25, 2020

(54) APPARATUS AND METHOD FOR COMMUNICATION (75) Inventors: Esa Tapani Tiirola, Kempele (FI); Kari Juhani Hooli, Oulu (FI); Kari Pekka Pajukoski, Oulu (FI); Timo Erkki Lunttila, Espoo (FI)

(73) Assignee: HMD Global Oy, Espoo (FI)

( * ) Notice: Subject to any disclaimer, the term of this patent is extended or adjusted under 35 U.S.C. 154(b) by 0 days.

(21) Appl. No.: 13/264,822

(22) PCT Filed: Apr. 17, 2009

(86) PCT No.: PCT/EP2009/054598
§ 371 (c)(1),
(2), (4) Date: Dec. 12, 2011

(87) PCT Pub. No.: WO2010/118781
PCT Pub. Date: Oct. 21, 2010

(65) Prior Publication Data
US 2012/0093104 A1    Apr. 19, 2012

(51) Int. Cl.
*H04W 72/04*     (2009.01)
*H04L 5/00*      (2006.01)
*H04L 1/18*      (2006.01)
(52) U.S. Cl.
CPC .......... *H04L 5/0053* (2013.01); *H04L 1/1887* (2013.01)
(58) Field of Classification Search
None
See application file for complete search history.

(56) References Cited

U.S. PATENT DOCUMENTS

| 8,068,457 B2 * | 11/2011 | Pi et al. ............... 370/329 |
| 8,532,015 B2 * | 9/2013 | Che et al. ............. 370/315 |
| 2007/0242636 A1 | 10/2007 | Kashima et al. |

(Continued)

FOREIGN PATENT DOCUMENTS

| CN | 101248632 A | 8/2008 |
| CN | 101406081 A | 4/2009 |

(Continued)

OTHER PUBLICATIONS

LG Electronics; "PUCCH TxD Schemes for LTE-A (R1-091211)"; 3GPP TSG RAN WG1 meeting #56bis; Agenda item: 15.5; Mar. 23, 2009; Seoul, Korea.

(Continued)

*Primary Examiner* — Willie J Daniel, Jr
(74) *Attorney, Agent, or Firm* — Harrington & Smith (57) ABSTRACT Apparatus and method for communication are provided. An apparatus includes a receiver configured to receive control and data signal; a transmitter configured to transmit control information on an uplink channel wherein a number of uplink control channel indexes corresponding to the number of control channel elements as on the downlink control channel is available, the transmission requiring more than one uplink channel index; and a controller. If one control channel index is available, the controller is configured to control the transmission of control information to utilise the uplink control channel index and control the transmission of control information related to a second control channel index based on a separate channel or adjusting transmission properties when transmitting the control information.

16 Claims, 5 Drawing Sheets (56) References Cited

U.S. PATENT DOCUMENTS

| | | | |
|---|---|---|---|
| 2008/0259856 A1 | 10/2008 | Frederiksen et al. | |
| 2008/0305745 A1* | 12/2008 | Zhang et al. | 455/67.11 |
| 2010/0195587 A1* | 8/2010 | Ratasuk | H04L 1/1614 |
| | | | 370/329 |
| 2011/0286436 A1* | 11/2011 | Suzuki | H04L 5/0048 |
| | | | 370/336 |
| 2012/0039285 A1* | 2/2012 | Seo et al. | 370/329 |

FOREIGN PATENT DOCUMENTS

| | | |
|---|---|---|
| WO | WO 2008/085000 A1 | 7/2008 |
| WO | WO 2008/111808 A1 | 9/2008 |
| WO | WO 2008/115004 A2 | 9/2008 |
| WO | WO 2008/137864 A2 | 11/2008 |
| WO | WO 2010/101411 A2 | 9/2010 |

OTHER PUBLICATIONS

Huawei; "PUCCH design for carrier aggregation (R1-091275)"; 3GPP TSG RAN WG1 meeting #56bis; Agenda item: 15.4; Mar. 23, 2009; Seoul, Korea.

3GPP TS 36.213 V8.6.0 (Mar. 2009), "$3^{rd}$ Generation Partnership Project; Technical Specification Group Radio Access Network; Evolved Universal Terrestrial Radio Access (E-UTRA); Physical layer procedures (Release 8)", 76 pgs.

Gesbert, David, et al., "Chapter II—Multiple Antenna Techniques", LTE—The UMTS Long Term Evolution: From Theory to Practice, 2009, pp. 243-283.

* cited by examiner

| CYCLIC SHIFT | ORTHOGONAL COVER CODE | | | |
|---|---|---|---|---|
| | 0 | 1 | 2 | 4 |
| 0 | 0 | | | |
| 1 | 0_2 | 4 | | |
| 2 | | | 8 | |
| 3 | 1 | | | |
| 4 | | 5 | | |
| 5 | | | 9 | |
| 6 | 2 | | | |
| 7 | | 6 | | |
| 8 | | | 10 | |
| 9 | 3 | | | |
| 10 | | 7 | | |
| 11 | | | 11 | |

FIG. 6

APPARATUS AND METHOD FOR COMMUNICATION

FIELD

The exemplary and non-limiting embodiments of the invention relate generally to wireless communication networks, and more specifically, to transmission and reception of data and control information.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

An important factor in designing a future communication system is the support of higher data rates cost-effectively. One communication system supporting high data rates is the 3rd Generation Partnership Project (3GPP) Long Term Evolution (LTE) Release 8 radio access technologies for providing higher data rates cost-effectively exist. An improved version of the Long Term Evolution radio access system is called LTE-Advanced (LTE-A). The LTE is designed to support high-speed data, multimedia unicast and multimedia broadcast services.

Typically, higher data rates also set increased requirements for control signalling. Uplink control signals, such as Acknowledgement (ACK), Negative Acknowledgement (NACK), Channel Quality Indicator (CQI), and uplink scheduling requests may be transmitted on a Physical Uplink Control Channel (PUCCH) in the absence of uplink data.

One solution for providing higher data rates is a single user multiple input multiple output (SU-MIMO) method. In SU-MIMO, user equipment utilizes more than one antenna in communicating with base stations. Typically, the number of antennas may be two to four. However, the number of antennas is not limited to any specific number.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

According to another aspect of the present invention, there is provided a method in user equipment utilizing single user multiple input multiple output transmission, the method comprising: receiving control and data signals on a downlink control channel, wherein an aggregation of one or more control channel elements is reserved for the transmission of the control signals; transmitting control information on an uplink channel wherein a number of uplink control channel indexes corresponding to the number of control channel elements as on the downlink control channel is available, the transmission requiring more than one uplink channel index; wherein if more than one control channel index is available, the transmission of control information utilises the uplink control channel index corresponding to the lowest downlink channel element in which the control data was received, and uplink control channel index corresponding to another predetermined channel element in which the control data was received, and if one control channel index is available, the transmission of control information utilises the uplink control channel index element corresponding to the lowest downlink control channel element and the transmission of control information related to a second control channel index is based on a separate channel or adjusting transmission properties when transmitting the control information.

According to another aspect of the present invention, there is provided a method in user equipment utilizing single user multiple input multiple output transmission, the method comprising: receiving control and data signals on a downlink control channel, wherein an aggregation of one or more control channel elements is reserved for the transmission of the control signals; transmitting control information on an uplink channel wherein a number of uplink control channel indexes corresponding to the number of control channel elements as on the downlink control channel is available, the transmission requiring more than one uplink channel index; wherein if more than one control channel index is available, the transmission of control information utilises the uplink control channel index corresponding to the lowest downlink channel element in which the control data was received, and uplink control channel index corresponding to another predetermined channel element in which the control data was received, and if one control channel index is available, the transmission of control information utilises the control channel index corresponding to the lowest downlink channel element in which the control data was received.

According to an aspect of the present invention, there is provided an apparatus utilizing single user multiple input multiple output transmission, the apparatus comprising: a receiver configured to receive control and data signal on a downlink control channel, wherein an aggregation of one or more control channel elements is reserved for the transmission of the control signals; a transmitter configured to transmit control information on an uplink channel wherein a number of uplink control channel indexes corresponding to the number of control channel elements as on the downlink control channel is available, the transmission requiring more than one uplink channel index; and a controller operatively connected to the receiver and the transmitter, wherein if more than one channel index is available, the controller is configured to control the transmission of control information to utilise the control channel index corresponding to the lowest channel element in which the data was received, and a control channel index corresponding to another predetermined channel element in which the control data was received, and if one control channel index is available, the controller is configured to control the transmission of control information to utilise the uplink control channel index and control the transmission of control information related to a second control channel index based on a separate channel or adjusting transmission properties when transmitting the control information.

According to an aspect of the present invention, there is provided an apparatus utilizing single user multiple input multiple output transmission, the apparatus comprising: a receiver configured to receive control and data signal on a downlink control channel, wherein an aggregation of one or more control channel elements is reserved for the transmission of the control signals; a transmitter configured to transmit control information on an uplink channel wherein a number of uplink control channel indexes corresponding to the number of control channel elements as on the downlink control channel is available, the transmission requiring more than one uplink channel index; and a controller operatively connected to the receiver and the transmitter, wherein if more than one channel index is available, the controller is configured to control the transmission of control information to utilise the control channel index corresponding to the lowest channel element in which the data was received, and a control channel index corresponding to another predetermined channel element in which the control data was received, and if one control channel index is available, the controller is configured to control the transmission of control information to utilise the control channel index corresponding to the lowest downlink channel element in which the control data was received.

According to an aspect of the present invention, there is provided an apparatus comprising: a transmitter configured to transmit control and data signals on a downlink control channel, wherein an aggregation of one or more control channel elements is reserved for the transmission; a receiver configured to receive control information on an uplink channel wherein a number of uplink control channel indexes corresponding to the number of control channel elements as on the downlink control channel is available, the transmission being single user multiple input multiple output and requiring more than one uplink channel index; and a controller operatively connected to the receiver and the transmitter, wherein if more than one control channel index is available, the controller is configured to control the receiver to receive the control information in the uplink control channel index corresponding to the lowest downlink channel element in which the control data was transmitted, and in an uplink control channel index corresponding to another predetermined channel element in which the control data was transmitted, and if one control channel index is available, the controller is configured to control the receiver to receive control information in the uplink control channel index corresponding to the lowest downlink control channel element and control the transmission of control information related to a second control channel index based on a separate channel or adjusting transmission properties when receiving the control information.

According to an aspect of the present invention, there is provided an apparatus comprising: a transmitter configured to transmit control and data signals on a downlink control channel, wherein an aggregation of one or more control channel elements is reserved for the transmission; a receiver configured to receive control information on an uplink channel wherein a number of uplink control channel indexes corresponding to the number of control channel elements as on the downlink control channel is available, the transmission being single user multiple input multiple output and requiring more than one uplink channel index; and a controller operatively connected to the receiver and the transmitter, wherein if more than one control channel index is available, the controller is configured to control the receiver to receive the control information in the uplink control channel index corresponding to the lowest downlink channel element in which the control data was transmitted, and in an uplink control channel index corresponding to another predetermined channel element in which the control data was transmitted, and if one control channel index is available, the controller is configured to control the receiver to receive control information in the control channel index corresponding to the lowest downlink channel element in which the control data was transmitted.

According to another aspect of the present invention, there is provided a method comprising: transmitting control and data signals on a downlink control channel, wherein an aggregation of one or more control channel elements is reserved for the transmission; receiving control information on an uplink channel wherein a number of uplink control channel indexes corresponding to the number of control channel elements as on the downlink control channel is available, the transmission being single user multiple input multiple output and requiring more than one uplink channel index; wherein if more than one control channel index is available, the control information is received in the uplink control channel index corresponding to the lowest channel element in which the control data was transmitted, and in an uplink control channel index corresponding to another predetermined channel element in which the control data was transmitted, and if one control channel index is available, the control information is received in the uplink control channel index and the control of the transmission of control information related to a second control channel index is based on a separate channel or adjusting transmission properties when receiving the control information.

According to another aspect of the present invention, there is provided a method comprising: transmitting control and data signals on a downlink control channel, wherein an aggregation of one or more control channel elements is reserved for the transmission; receiving control information on an uplink channel wherein a number of uplink control channel indexes corresponding to the number of control channel elements as on the downlink control channel is available, the transmission being single user multiple input multiple output and requiring more than one uplink channel index; wherein if more than one control channel index is available, the control information is received in the uplink control channel index corresponding to the lowest channel element in which the control data was transmitted, and in an uplink control channel index corresponding to another predetermined channel element in which the control data was transmitted, and if one control channel index is available, the control information is received in the control channel index corresponding to the lowest downlink channel element in which the control data was transmitted.

According to another aspect of the present invention, there is provided a computer readable memory embodying a program of instructions executable by a processor to perform actions directed toward transmission and reception of data and control information, the actions comprising: transmitting control and data signals on a downlink control channel, wherein an aggregation of one or more control channel elements is reserved for the transmission; receiving control information on an uplink channel wherein a number of uplink control channel indexes corresponding to the number of control channel elements as on the downlink control channel is available, the transmission being single user multiple input multiple output and requiring more than one uplink channel index; wherein if more than one control channel index is available, the control information is received in the uplink control channel index corresponding to the lowest channel element in which the control data was transmitted, and in an uplink control channel index corresponding to another predetermined channel element in which the control data was transmitted, and if one control channel index is available, the control information is received in the uplink control channel index and the control of the transmission of control information related to a second control channel index is based on a separate channel or adjusting transmission properties when receiving the control information.

According to yet another aspect of the present invention, there is provided a computer readable memory embodying a program of instructions executable by a processor to perform actions directed toward transmission and reception of data and control information, the actions comprising: receiving control and data signals on a downlink control channel, wherein an aggregation of one or more control channel elements is reserved for the transmission of the control signals; transmitting control information on an uplink channel wherein a number of uplink control channel indexes corresponding to the number of control channel elements as on the downlink control channel is available, the transmission requiring more than one uplink channel index; wherein if more than one control channel index is available, the transmission of control information utilises the uplink control channel index corresponding to the lowest downlink channel element in which the control data was received, and uplink control channel index corresponding to another predetermined channel element in which the control data was received, and if one control channel index is available, the transmission of control information utilises the uplink control channel index element corresponding to the lowest downlink control channel element and the transmission of control information related to a second control channel index is based on a separate channel or adjusting transmission properties when transmitting the control information.

LIST OF DRAWINGS

Embodiments of the present invention are described below, by way of example only, with reference to the accompanying drawings, in which.

DESCRIPTION OF SOME EMBODIMENTS

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments of the present invention are applicable to any user terminal, server, corresponding component, and/or to any communication system or any combination of different communication systems utilizing reference signals and cyclic shift of reference signals. The communication system may be a wireless communication system or a communication system utilizing both fixed networks and wireless networks. The protocols used and the specifications of communication systems, servers and user terminals, especially in wireless communication, develop rapidly. Such development may require extra changes to an embodiment. Therefore, all words and expressions should be interpreted broadly and are intended to illustrate, not to restrict, the embodiment.

In the following, different embodiments will be described using, as an example of a system architecture to which the embodiments may be applied, an architecture based on the third-generation wireless communication system UMTS (Universal Mobile Telecommunication System) without restricting the embodiment to such an architecture, however.

Figure 1A:
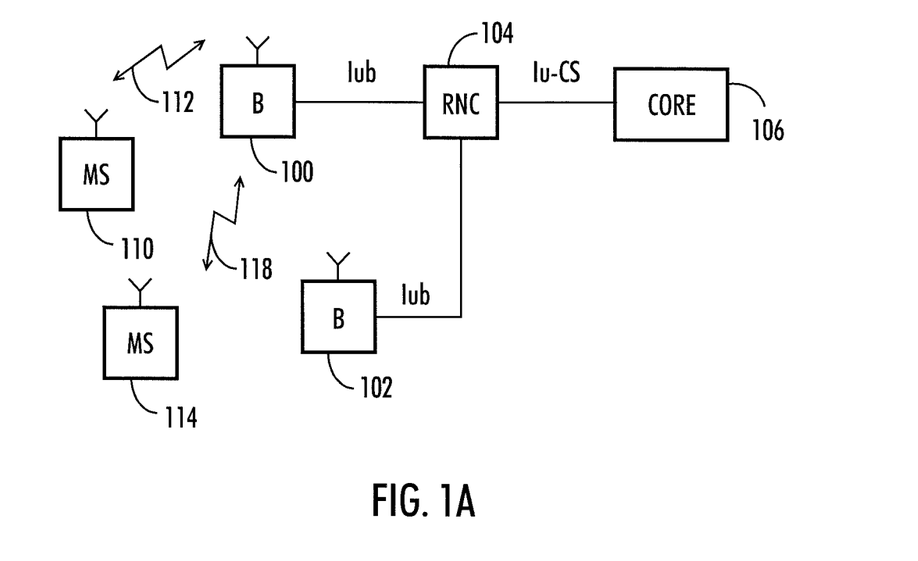
FIG. 1A shows a simplified block diagram illustrating an exemplary system architecture.

A general architecture of a communication system is illustrated in FIG. 1A. FIG. 1A is a simplified system architecture only showing some elements and functional entities, all being logical units whose implementation may differ from what is shown. The connections shown in FIG. 1A are logical connections; the actual physical connections may be different. It is apparent to a person skilled in the art that the systems also comprise other functions and structures. It should be appreciated that the functions, structures, elements, and protocols used in or for group communication are irrelevant to the actual invention. Therefore, they need not be discussed in more detail here.

FIG. 1A shows two base stations or Node Bs 100 and 102. The base stations 100 and 102 are connected to a common server 104 of the network. The common server 104 may include an operation and maintenance (O&M) server 120 and a mobility management server 122. Typically, the functionalities of the O&M server include initial cell-level radio resources allocation, performance monitoring, for example. The functionalities of the mobility management server may take care of routing the connections of user equipment. The connections between the node Bs and the servers may be implemented by using Internet Protocol (IP) connections.

The communication network may further comprise a core network 106 connected to the common server 104.

FIG. 1A shows user equipment 110 and 114 communicating 112, 118 with the node B 100. The user equipment refers to a portable computing device. Such computing devices include wireless mobile communication devices operating with or without a subscriber identification module (SIM), including, but not limited to, the following types of devices: mobile phone, smartphone, personal digital assistant (PDA), handset, laptop computer.

FIG. 1A only illustrates a simplified example. In practice, the network may include more base stations and radio network controllers, and more cells may be formed by the base stations. The networks of two or more operators may overlap, the sizes and form of the cells may vary from that depicted in FIG. 1, etc.

The physical layer of the LTE includes orthogonal frequency division multiple access (OFDMA) and multiple-input and multiple-output (MIMO) data transmission. For example, the LTE deploys the OFDMA for the downlink transmission and single carrier frequency division multiple access (SC-FDMA) for the uplink transmission. In OFDMA, the transmission frequency band is divided into multiple sub-carriers orthogonal to each other. Each sub-carrier may transmit data to specific UE 110, 114. Thus, multiple access is achieved by assigning subsets of sub-carriers to any individual UE 110, 114. The SC-FDMA, on the other hand, is a type of a discrete Fourier transform (DFT) precoded OFDMA scheme. It utilizes single carrier modulation, orthogonal frequency domain multiplexing and frequency domain equalization.

It should be appreciated that the base stations or node Bs may also be connectable to core network elements directly (not shown in the figure). Depending on the system, the counterpart on the core network side can be a mobile services switching centre (MSC), a media gateway (MGW), or a serving GPRS (general packet radio service) support node (SGSN), a home node B gateway (HNB-GW), a mobility management entity and enhanced packet core gateway (MME/EPC-GW), etc. Direct communication between different node Bs over an air interface is also possible by implementing a relay node concept, wherein a relay node may be considered as a special node B having wireless backhauls or, e.g., X2 and S1 interfaces relayed over the air interface by another node B. The communication system is also able to communicate with other networks, such as a public switched telephone network.

The embodiments are not, however, restricted to the network given above as an example, but a person skilled in the art may apply the solution to other communication networks provided with the necessary properties. For example, the connections between different network elements may be realized with Internet Protocol (IP) connections.

Figure 1B:
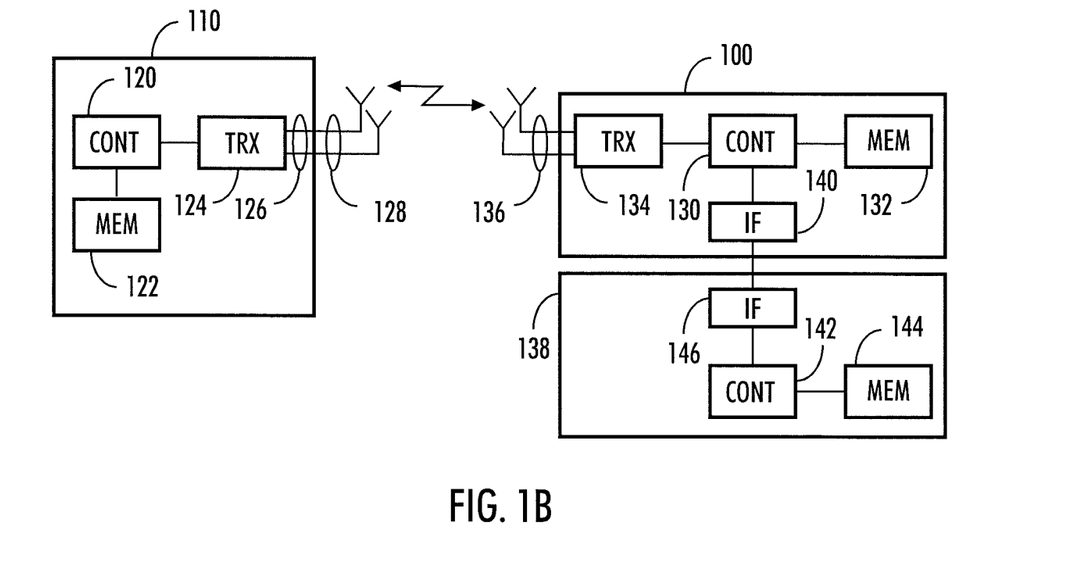
FIG. 1B illustrates examples of apparatuses according to embodiments of the invention.

FIG. 1B illustrates examples of apparatuses according to embodiments of the invention. FIG. 1B shows user equipment 110 configured to be in connection with a base station 100 on a communication channel 112. The user equipment 110 comprises a controller 120 operationally connected to a memory 122 and a transceiver 124. The controller 120 controls the operation of the user equipment. The memory 122 is configured to store software and data. The transceiver is configured to set up and maintain a wireless connection to the base station 100. The transceiver is operationally connected to a set of antenna ports 126 connected to an antenna arrangement 128. The antenna arrangement may comprise a set of antennas. The number of antennas may be two to four, for example. The number of antennas is not limited to any particular number.

The base station or node B 100 comprises a controller 130 operationally connected to a memory 132 and a transceiver 134. The controller 138 controls the operation of the base station. The memory 132 is configured to store software and data. The transceiver 134 is configured to set up and maintain a wireless connection to user equipment within the service area of the base station. The transceiver 134 is operationally connected to an antenna arrangement 136. The antenna arrangement may comprise a set of antennas. The number of antennas may be two to four, for example. The number of antennas is not limited to any particular number.

The base station may be operationally connected to another network element 138 of the communication system. The network element 138 may be a radio network controller, another base station, a gateway, or a server, for example. The base station may be connected to more than one network element. The base station 100 may comprise an interface 140 configured to setup and maintain the connection with the network element. The network element 138 may comprise a controller 142 and a memory 144 configured to store software and data and an interface 146 configured to be in connection with the base station. In an embodiment, the network element is connected to the base station via another network element.

The LTE-A provides a physical uplink control channel (PUCCH) as an uplink access link from the UE 110, 114 to the base stations or Node Bs 100 and 102. The PUCCH may be used to transmit control information to the base stations or Node Bs indicating an acknowledgement (ACK)/a negative-ACK (NACK), a measure of a channel quality and/or a scheduling request (SR). In addition, PUCCH transmissions may comprise demodulation reference symbols/signals (DM RS).

The PUCCH may be divided into different formats. Format 1 is generated for transmitting an un-modulated scheduling request indicator (SRI) indicating a need for uplink transmission. The need for the uplink transmission may be due to data that has been buffered in the UE 110, 114 and is waiting to be transmitted in the uplink transmission. Format 1a/1b of PUCCH is applied to transmission of an ACK/NACK indicator only indicating correctness of a received downlink data. The ACK/NACK indicator may consist of one or two bits and it may be transmitted by means of a modulated sequence. The modulation is obtained by means of binary phase shift keying (BPSK) or quadrature phase shift keying (QPSK). Further, the modulated ACK/NACK sequence may be affected by computer searched zero-autocorrelation (CAZAC) sequences. In addition, block spreading by using orthogonal codes may be performed on the sequence. Format 2/2a/2b denotes transmission of a periodic CQI and CQI+ACK/NACK indicator.

In an embodiment, user equipment of an LTE based system is configured to receive control and data signals on a physical downlink control channel (PDCCH). PDCCH is transmitted on an aggregation of several consecutive control channel elements (CCE). The aggregations follow a tree structure. A single PDCCH can consist of different number of CCEs. In LTE Release 8, aggregation levels of 1, 2, 4 and 8 CCEs have been defined.

Figure 2:
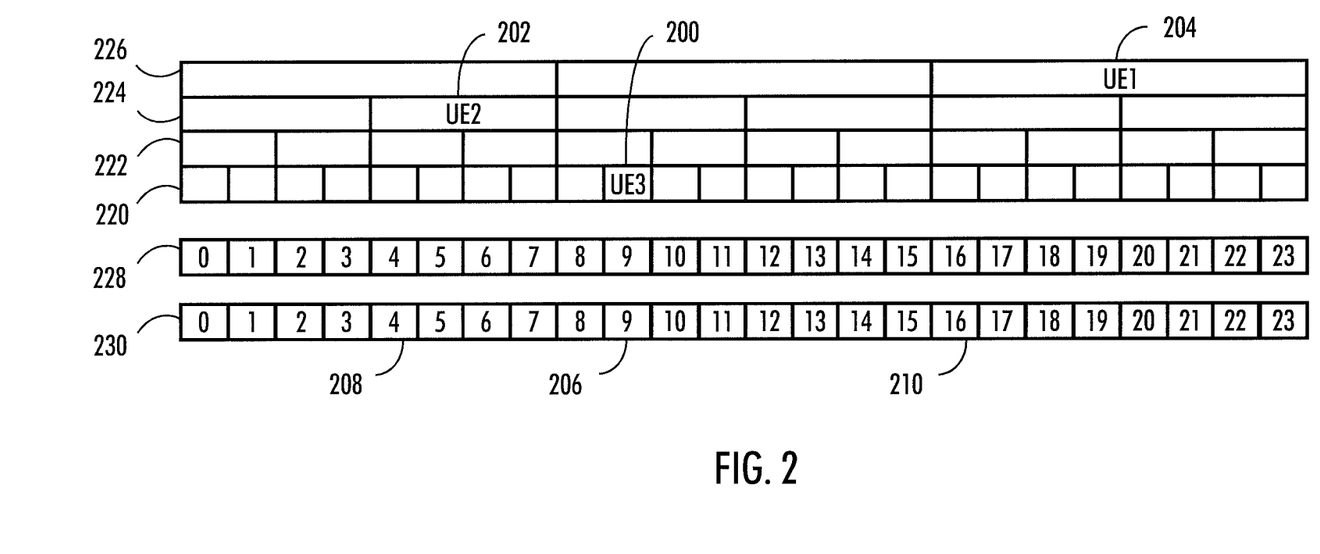
FIG. 2 illustrates a tree structure of a physical downlink control channel PDCCH.

FIG. 2 illustrates the tree structure of PDCCH. FIG. 2 shows available aggregation levels 1, 2, 4 and 8 220, 222, 224,226. In addition, a control channel element index 228 and Format 1a/1b resource index, $n_{PUCCH}^{(1)}$ 230 are illustrated.

When the aggregation level equals 1, one control channel element is reserved from the PDCCH. Correspondingly, when the aggregation level equals 2, 4 and 8, the number of reserved PDCCH control channel elements equals 2, 4, and 8. FIG. 2 illustrates an example where one CCE 200 is reserved for UE1. In another example, four CCEs 202 are reserved from PDCCH for second UE reception. In the third example, the aggregation level equals 8 and eight CCEs 204 are reserved for third UE.

In the current 3GPP LTE standards, the PUCCH Format 1a/1b resources for dynamic ACK/NACK (both the ACK/NACK data and the DM RS) transmissions are indicated implicitly by the lowest control channel element (CCE) of a corresponding Physical Downlink Control Channel (PDCCH). Typically, the resources for the downlink PDCCH and the uplink acknowledgement are reserved at the same time (even though they are applied to different subframes in uplink and downlink). In the example of FIG. 2, the first UE sends ACK or NACK in PUCCH CCE 206. Respectively, the second UE sends ACK or NACK in PUCCH CCE 208 and the third UE in PUCCH CCE 210.

A PUCCH Format 1a/1b resource index, $n_{PUCCH}^{(1)}$, for dynamically scheduled Physical Downlink Shared Channel (PDSCH) is derived by the following equation:

$$n_{PUCCH}^{(1)} = n_{CCE} + N_{PUCCH}^{(1)},$$

where $n_{CCE}$ is the index for the lowest PDCCH control channel element, as illustrated in FIG. 1, and $N_{PUCCH}^{(1)}$ is a system parameter configured by higher layers (i.e., the number of PUCCH Format 1/1a/1b resources reserved). The equation is presented in 3GPP document TS 36.213, section 10.1.

As SU-MIMO is likely to be supported in LTE-A, user equipment 110, 114 may be configured to communicate with the base station utilizing more than one antenna. Typically, the number of antennas may be two to four. However, the number of antennas is not limited to any specific number.

The above described implicit mapping and PUCCH resource provisioning related to Rel'8 do not support the usage of multiple PUCCH resources for ACK/NACK transmissions at the same time.

Let us consider an embodiment where user equipment applying SU-MIMO needs to transmit control information on PUCCH and the transmission requires more than one uplink CCE.

As FIG. 2 illustrates, when aggregation level 2, 4 or 8 is used on PDCCH, there are more than one control channel index on the uplink PUCCH available to ACK/NACK transmissions. The number of available indexes corresponds to the aggregation level.

In an embodiment, if more than one control channel index is available, the transmission of control information utilises the uplink control channel index corresponding to the lowest downlink channel element in which the control data was received, and uplink control channel index corresponding to a predetermined channel element in which the control data was received.

Figure 3A:
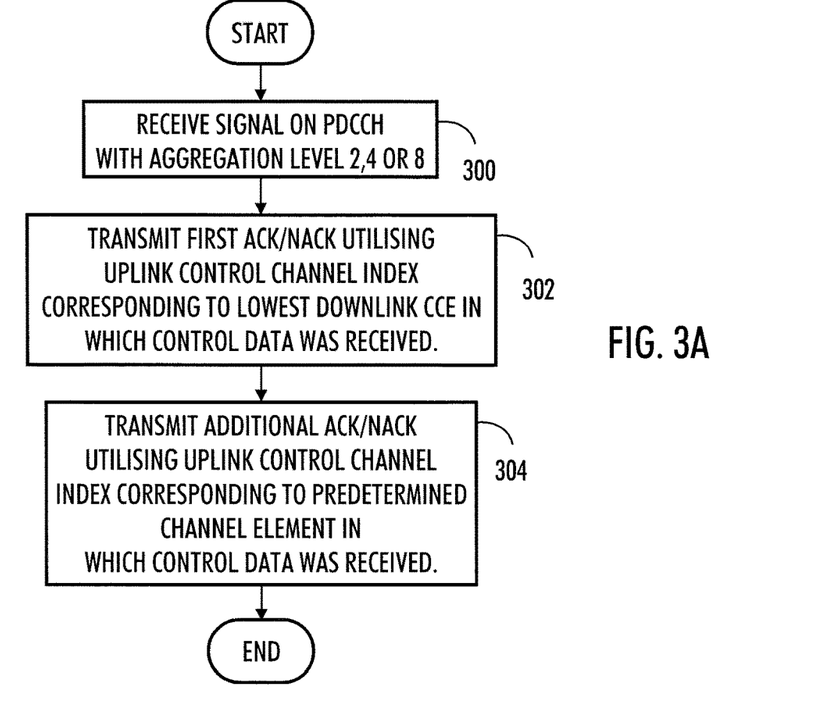
FIGS. 3A, 3B, and 3C are flowcharts illustrating embodiments.

FIG. 3A is a flowchart illustrating an embodiment. In step 300, user equipment utilizing single user multiple input multiple output transmission receives a control and data signal on PDCCH with aggregation level 2, 4 or 8.

In step 302, the controller 120 of the user equipment controls the user equipment to transmit first ACK/NACK utilising the uplink control channel index corresponding to the lowest downlink channel element in which the control data was received.

In step 304, the controller 120 of the user equipment controls the user equipment to transmit additional ACK/NACK utilising an uplink control channel index corresponding to a predetermined channel element in which the control data was received.

In an embodiment, the predetermined index is either the second or the last index corresponding to a predetermined channel element in which the control data was received.

Thus, with aggregation level 8, there are seven possible alternatives. With aggregation level 4, there are three possible alternatives. With aggregation level 2, there is one index available. The number of additional ACK/NACK transmissions may depend on the MIMO method used.

As FIG. 2 illustrates, when aggregation level 1 is used on PDCCH, there is only one control channel index on the uplink PUCCH available for ACK/NACK transmissions. The above-described solution is not applicable in this situation.

In an embodiment where only one control channel index is available, the transmission of control information utilises the uplink control channel index element corresponding to the lowest downlink control channel element and the utilization of additional control channel index is based on a separate channel or adjusting transmission properties.

Figure 3B:
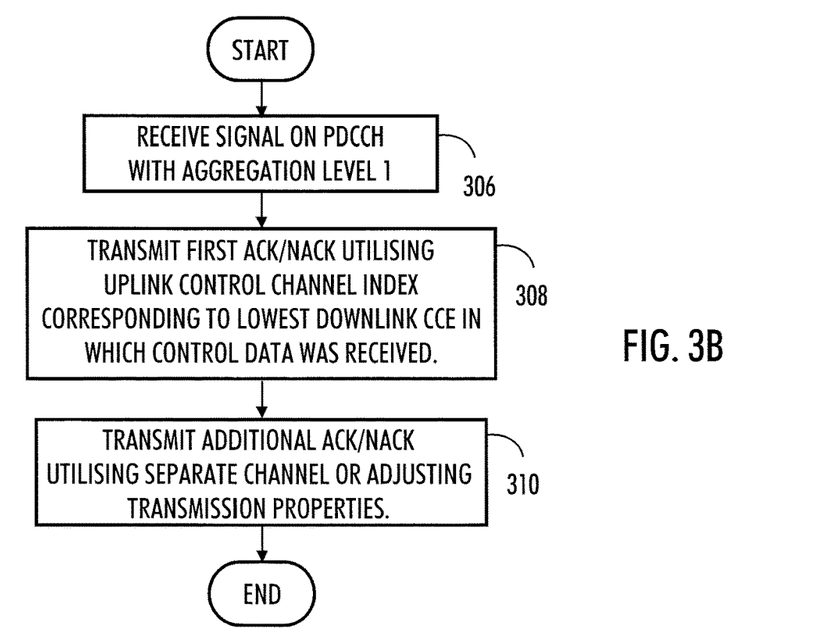

FIG. 3B is a flowchart illustrating an embodiment. In step 306, user equipment utilizing single user multiple input multiple output transmission receives a control and data signal on PDCCH with aggregation level 1.

In step 308, the controller 120 of the user equipment controls the user equipment to transmit first ACK/NACK utilising the uplink control channel index corresponding to the lowest downlink channel element in which the control data was received.

In step 310, the controller 120 of the user equipment controls the user equipment to transmit additional ACK/NACK utilising a separate channel or adjusting transmission properties of the available channel.

In an embodiment, the available control channel index is allocated to a predetermined antenna or a predetermined group of antennas.

In an embodiment when one control channel index is available, the transmission of control information corresponds to single-antenna transmission or precoded-single stream transmission.

Figure 3C:
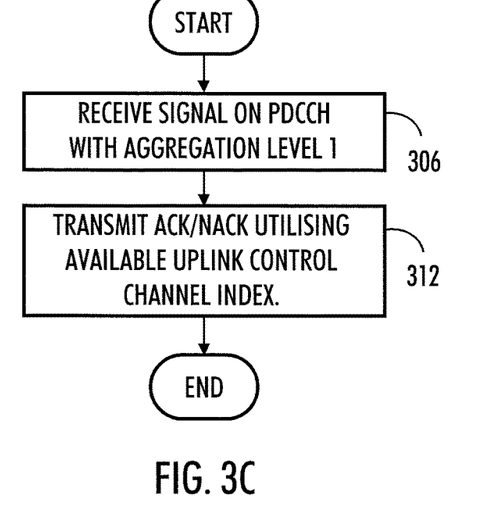

FIG. 3C is a flowchart illustrating another embodiment. In step 306, user equipment utilizing single user multiple input multiple output transmission receives a control and data signal on PDCCH with aggregation level 1.

In step 312, the controller 120 of the user equipment controls the user equipment to transmit ACK/NACK utilising the available uplink control channel index.

Thus, in this embodiment, the user equipment is configured to utilize a single-antenna transmission scheme when PDCCH contains only a single CCE. It is also possible to apply antenna switching between two slots in this case. Alternatively, it is possible that a predetermined antenna is selected for transmission. Different power control parameters may be applied as well. In this solution, there are no scheduling restrictions between ACK/NACK transmissions of different user equipment. In addition, there is no increase in PUCCH overhead. There may be slight performance problems as a single antenna scheme is used. However, as aggregation level 1 is used in the downlink it may be assumed that a signal to noise ratio SINR is relatively high and the single antenna transmission produces no problems.

In LTE Frequency Division Duplex (FDD), the ACK/NACK message signalled in uplink relates to a single DL subframe and to one or two PDSCH codewords (bits). In LTE TDD, it is allowed to transmit ACK/NACK corresponding to multiple DL subframes. Two options exist with LTE TDD, ACK/NACK bundling and ACK/NACK multiplexing. In the case of ACK/NACK bundling, a logical AND operation is performed on the ACK/NACK bits corresponding to multiple DL subframes (and/or spatial layers). In the case of LTE-Advanced, ACK/NACK bundling can be applied to multiple component carriers as well.

The utilization of a second control channel in connection with SU-MIMO user equipment utilising a separate channel or adjusting transmission properties of a transmission channel may be realized in various ways. In an embodiment, the network comprises a network element responsible for channel allocations within the area of a Node B. The network element may be the Node B itself.

The network element may be configured to determine the suitable method for allocating resources for the transmission of uplink control information. The network element may be configured to send user equipment utilizing single user multiple input multiple output transmission information regarding the channel allocation of downlink and uplink channels, including one or more control channel index for the transmission of uplink control information. The user equipment may be configured to receive instructions from the network element and act accordingly.

In the case when the PDCCH consists of multiple control channel elements, there will be multiple PUCCH Format 1/1a/1b resources reserved. This allows the usage of open-loop transmission diversity techniques when transmitting ACK/NACK feedback corresponding to dynamically scheduled PDSCH. When the PDCCH consists of only a single control channel element, there will be just one PUCCH Format 1/1a/1b resource reserved by default. In these cases user equipment can utilize single antenna transmission with a predetermined antenna instead on open-loop transmission diversity scheme. The selected antenna can be based on user equipment selection or it can be selected by the Node B. Alternatively, it is possible to apply precoded single stream transmission which also requires only a single PUCCH Format 1/1a/1b resource.

Figure 4A:
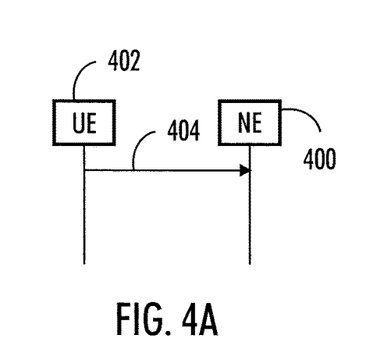
FIGS. 4A and 4B are signalling charts illustrating embodiments.

The signalling chart of FIG. 4A illustrates an embodiment. In this embodiment, the network element 400 responsible for channel allocations is configured to send user equipment 402 utilizing single user multiple input multiple output transmission a channel allocation 404 for a downlink channel wherein an aggregation of more than one control channel element is reserved for the transmission. Thus, user equipment applying SU-MIMO does not receive a scheduling of a PDSCH with a PDCCH containing only a single CCE. The second ACK/NACK channel (or possibly 2nd, 3rd and 4th channel with 4 tx antennas) is indicated implicitly by a predetermined control channel index as described earlier. The channel allocations of other user equipment of the system are not limited this way. In this solution, there is no increase in the PUCCH overhead.

As an alternative it can be defined that a single CCE containing an uplink acknowledgement grant for SU-MIMO user equipment must not be followed by a CCE containing another uplink acknowledgement grant or part of it (DL assignment can still be scheduled on that CCE). Thus, there would always be a vacant CCE available to the SU-MIMO user equipment. Typically, the resources for the downlink PDCCH and the uplink acknowledgement are reserved at the same time. In the example of FIG. 2, the UE1 receives resources for downlink PDCCH 200 and the uplink acknowledgement 206. In this alternative option, assuming that the UE1 utilises SU-MIMO, the uplink CCE following the index 200 is not allocated to any other UE.

Figure 4B:
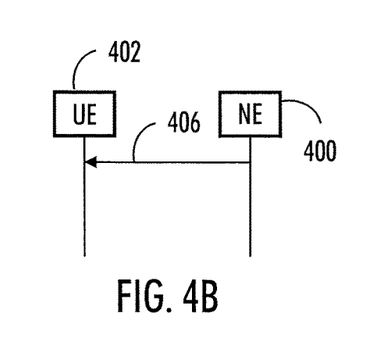

The signalling chart of FIG. 4B illustrates an embodiment. In this embodiment, the network element 400 responsible for channel allocations is configured to send user equipment 402 utilizing single user multiple input multiple output an allocation 406 of one or more additional control channel indexes for the transmission of uplink control information. Thus, PUCCH Format 1a/1b resources to be applied as the additional ACK/NACK channels may be signalled explicitly for the SU-MIMO user equipment which receives control and data signals on PDCCH with aggregation level 1. This special allocation is not required for SU-MIMO user equipment with other aggregation levels.

This special allocation is easy to implement as PUCCH Format 1a/1b resource configuration used for repeated ACK/NAK may be reused.

Figure 5:
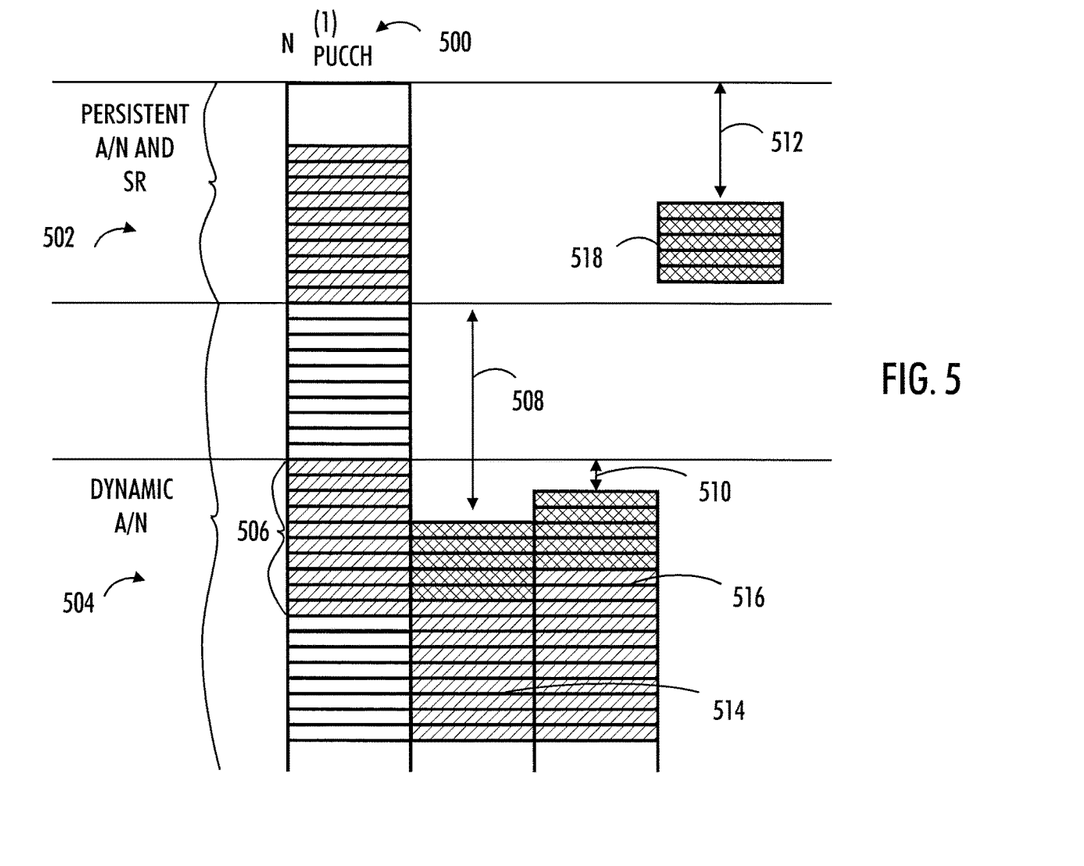
FIG. 5 illustrates a channel space structure of a PUCCH Format 1a/1b channel.

FIG. 5 illustrates a channel space structure of a PUCCH Format 1a/1b channel. The possible values of $n_{PUCCH}^{(1)}$ may be considered as a stack 500. A given number of successive channel indexes $n_{PUCCH}^{(1)}$ on an uplink control channel is reserved for control transmissions of user equipment within a given coverage area of a base station. The channel indexes comprise two groups comprising successive channel indexes. The group of indexes 502 is reserved for persistent resources. The second group of indexes 504 is reserved for dynamic resources. In an embodiment, the division is based on a broadcasted system parameter. In FIG. 5, the shaded indexes are indexes currently in use. For example, indexes 506 indicate the indexes in use within the resources reserved for dynamic resources. In an embodiment, the allocation of the second control channel index is based on a fixed offset with respect to a given position in the given number of indexes reserved for user equipment control transmissions.

In an embodiment, the allocation of a region 514 for the second control channel index is based on a fixed offset 508 with respect to a starting position of the group 504 of indexes denoted as dynamic resources. The offset 508 may be set such that the region for second control channel indexes is overlapping fully or partially with the dynamic ACK/NACK region 504. If the offset 508 is set to be large enough, a region for second control channel indexes is completely non-overlapping with the regular PUCCH Format 1a/1b resources.

In an embodiment, the allocation of a region 516 for the second control channel index is based on a fixed offset 510 with respect to an instantaneous size 506 of the group of indexes denoted as dynamic resources. It is known that the size of dynamic PUCCH Format 1a/1b resource depends on the Physical Control Format Indicator Channel (PCFICH). It is also possible to set the fixed offset corresponding to PCFICH=1, PCFICH=2, or PCFICH=3 regardless of the actual PCFICH signalled on PDCCH.

In an embodiment, the allocation of a region 518 for the second control channel index being based on a fixed offset 512 with respect to a starting position of the group of indexes denoted as persistent resources.

In an embodiment, separate offsets may be defined for the 2nd, $3^{rd}$, and 4th transmit antenna in the case of four transmit antenna operation.

As FIG. 5 illustrates, two approaches to defining the size of the region 514, 516, 518 for the second control channel index are considered, one with a limited size and another with an unlimited one. In FIG. 5, a double hatch denotes a fixed size and a single hatch an unlimited size. Next, an example of a principle of defining an ACK/NACK channel for the second antenna ($n_{PUCCH,2}^{(1)}$) is studied. In the following, K denotes the offset parameter (in terms of PUCCH Format 1/1a/1b channel index) and M equals to the size of the region of the second control channel index (with the cases when the size is limited). CCE denotes the index for the lowest PDCCH control channel element. In an embodiment, these parameters (M, K) are signalled via a broadcast system information or via dedicated control information, for example.

For the first embodiment of FIG. 5 (region 514):

Unlimitied size: $n_{PUCCH,2}^{(1)}=CCE+K$

Limited size: $n_{PUCCH,2}^{(1)}=\mod(CCE+K, M)$.

For the second embodiment of FIG. 5 (region 516):

Unlimited size: $n_{PUCCH,2}^{(1)}=CCE+K$

Limited size: $n_{PUCCH,2}^{(1)}=\mod(CCE+K, M)$.

For the third embodiment of FIG. 5 (region 518):

Limited size: $n_{PUCCH,2}^{(1)}=\mod(CCE+K, M)$.

In these embodiments, there is only a small marginal increase in PUCCH overhead, if any. In addition, the method is easily configured.

In an embodiment, the reservation of a logical PUCCH Format 1a/1b channel for additional control channel indexes is made outside the logical PUCCH Format 1/1a/1b channel space. A resource for the second control channel index may be allocated by applying in the transmission of the second control channel index a pre-defined cyclic shift offset with respect to the first control channel index.

Figure 6:
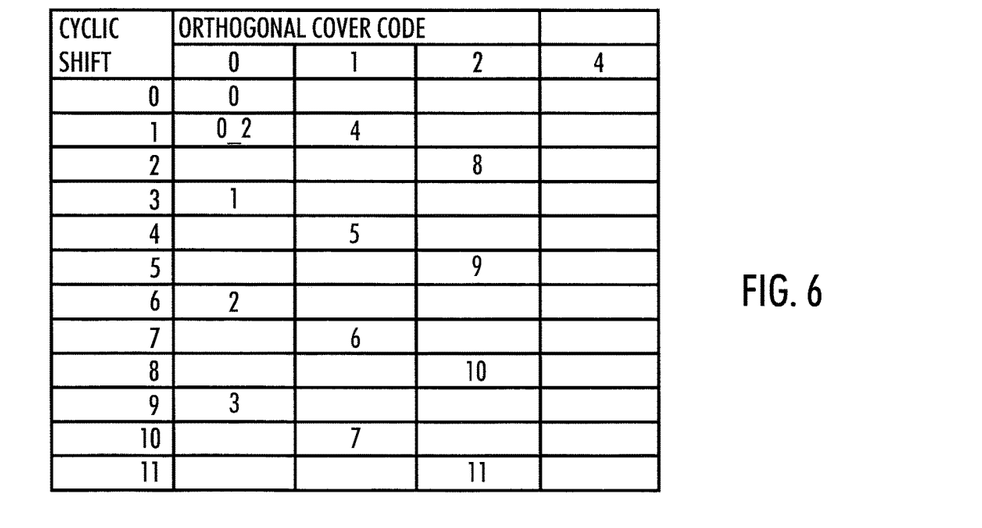
FIG. 6 illustrates an example of physical channel offset.

FIG. 6 illustrates an example of a physical channel offset. In the example of FIG. 6, the PUCCH resource for a second antenna ("0_2") is derived from the PUCCH resource reserved by the first antenna ("0"). The reservation can be carried out by using a pre-defined ΔCS (Cyclic Shift) and/or ΔOC (delta Orthogonal Cover code) offset, for example. The pre-defined offset may be signalled via higher layers.

In an embodiment, a separate offset may be defined for each transmit antenna in the case of four transmit antenna operation. An issue related to a physical channel offset is that it will decrease orthogonality between the resources. However, it is possible to improve the orthogonality between the occupied resources by means of increasing the value of the Δ_ shift parameter, for example. Δ_ shift defines the cyclic shift difference between two adjacent ACK/NACK resources using the same orthogonal cover sequence. The utilization of the 4th OC for the data part (3rd and 4th with a normal Cyclic Prefix) is also possible. It is noted that Cyclic Shift randomization techniques should be properly applied when a physical channel offset method is used. One approach is to have a different ΔCS (and/or ΔOC) for two slots.

In this embodiment, there are no collisions between occupied channels, as long as Δ_shift>1. In addition, there is no increase in PUCCH overhead.

In an embodiment, the methods described in connection with FIGS. 5 and 6 may be applied together. Thus, the allocation of the second control channel index may be based on a fixed offset with respect to a given position in the given number of indexes reserved for user equipment control transmissions and applying in the transmission of the second control channel index a pre-defined cyclic shift offset with respect to the first control channel index.

In an embodiment, a resource allocated for the user equipment for some other purpose may be utilised in the transmission of the second control channel index. Non-limiting examples of the resources which may be utilised include Scheduling Request (SR) resources, Channel Quality Indicator (CQI)/Precoding Matrix Indicator (PMI)/Rank Indicator (RI) resources and Persistent ACK/NACK resources.

If some of the abovementioned resources are unoccupied at the time of the ACK/NACK transmission, the vacant resources may be used as the second orthogonal ACK/NACK resource.

Some advantages of this embodiment include efficient resource allocation and minimized fragmentation of resources.

Apparatuses able to perform the above-described steps and actions may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an electronic apparatus, are configured to control the uplink transmission of control signals of user equipment utilizing single user multiple input multiple output transmission as described above.

The computer program may be in source code form, object code form, or in some intermediate form, and it may be stored in some sort of carrier, which may be any entity or device capable of carrying the program. Such carriers include a record medium, computer memory, read-only memory, an electrical carrier signal, a telecommunications signal, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising:
a transceiver configured to transmit on a downlink control channel to a user equipment using multiple input multiple output transmission a channel allocation for a downlink channel and reservation information for uplink ACK/NACK transmissions, wherein an aggregation of one or more control channel elements is reserved for the transmission on the downlink control channel;
a controller operatively connected to the transceiver, and
a memory including computer program code, wherein the memory and the computer code are configured, with the controller, to cause the apparatus to at least perform the following: control the transmitted channel allocation and the reservation information such that one control channel element is not followed by a control channel element containing at least a part of an uplink ACK/NACK transmission for any other user equipment,
wherein, for the uplink ACK/NACK transmission on the uplink control channel, resources are reserved comprising:
a first ACK/NACK resource indexed by the lowest downlink control channel element in which control data was received, and
a second ACK/NACK resource, and
a system parameter configured by higher layers; and
wherein one of the first ACK/NACK resource or the second ACK/NACK resource is reserved for the uplink ACK/NACK transmission for a first antenna of the user equipment, and another one of the first ACK/NACK resource or the second ACK/NACK resource is reserved for the uplink ACK/NACK transmission for a second antenna of the user equipment, and where the one of the first or second ACK/NACK resource reserved for the second antenna is derived from the other of the first or second ACK/NACK resource reserved for the first antenna.

2. The apparatus of claim 1,
wherein the transceiver further configured to receive the uplink ACK/NACK transmissions on an uplink control channel; and
wherein one uplink ACK/NACK transmission utilizes the uplink control channel index corresponding to one control channel element, and another uplink ACK/NACK transmission utilizes the uplink control channel index corresponding to the control channel element following the one control channel element.

3. The apparatus of claim 2, wherein the uplink control channel is a physical uplink control channel in a communication system for Long Term Evolution or Long Term Evolution Advanced.

4. The apparatus of claim 1, wherein the downlink control channel is a physical downlink control channel in a communication system for Long Term Evolution or Long Term Evolution Advanced.

5. A method comprising:
transmitting on a downlink control channel to a user equipment using multiple input multiple output transmission a channel allocation for a downlink channel and reservation information for uplink ACK/NACK transmissions,
wherein an aggregation of one or more control channel elements is reserved for the transmission on the downlink control channel; and
wherein the channel allocation and the reservation information are transmitted such that one control channel element is not followed by a control channel element containing at least a part of an uplink ACK/NACK transmission for any other user equipment, and
wherein, for the uplink ACK/NACK transmission on the uplink control channel, resources are reserved comprising:
a first ACK/NACK resource indexed by the lowest downlink control channel element in which control data was received, and
at least a second ACK/NACK resource, and
a system parameter configured by higher layer; and
wherein one of the first ACK/NACK resource or the at least second ACK/NACK resource is reserved for the uplink ACK/NACK transmission for a first antenna of the user equipment, and another one of the first ACK/NACK resource or the at least second ACK/NACK resource is reserved for the uplink ACK/NACK transmission for a second antenna of the user equipment, and where the one of the first or second ACK/NACK resource reserved for the second antenna is derived from the other of the first or second ACK/NACK resource being reserved for the first antenna.

6. The method of claim 5 further comprising receiving the uplink ACK/NACK transmissions on an uplink control channel; wherein one uplink ACK/NACK transmission utilizes the uplink control channel index corresponding to one control channel element, and another uplink ACK/NACK transmission utilizes the uplink control channel index corresponding to the control channel element following the one control channel element.

7. The method of claim 6, wherein the uplink control channel is a physical uplink control channel in a communication system for Long Term Evolution or Long Term Evolution Advanced.

8. The method of claim 5, wherein the downlink control channel is a physical downlink control channel in a communication system for Long Term Evolution or Long Term Evolution Advanced.

9. An apparatus comprising:
a receiver configured to receive a channel allocation on a downlink control channel for a downlink channel and reservation information for uplink ACK/NACK transmissions, wherein an aggregation of one or more control channel elements is reserved for the transmission on the downlink control channel;
a transmitter configured to transmit the uplink ACK/NACK transmissions on an uplink control channel;
a first antenna and a second antenna;
a controller operatively connected to the receiver and the transmitter, and
a memory including computer program code, wherein the memory and the computer code are configured, with the controller, to cause the apparatus to at least perform the following:
use multiple input multiple output transmission; and
transmit one uplink ACK/NACK transmission utilizing the control channel index corresponding to one control channel element, and another uplink acknowledgement utilizing the control channel index corresponding to the control channel element following the one control channel element,
wherein, for the uplink ACK/NACK transmission on the uplink control channel, resources are derived comprising:
a first ACK/NACK resource indexed by the lowest downlink control channel element in which control data was received, and
a second ACK/NACK resource, and
a system parameter configured by higher layer; and
wherein one of the first ACK/NACK resource or the second ACK/NACK resource is reserved for the uplink ACK/NACK transmission for the first antenna, and another one of the first ACK/NACK resource or the second ACK/NACK resource is reserved for the uplink ACK/NACK transmission for the second antenna, and where the one of the first or second second ACK/NACK resource is derived from the other of the first or second ACK/NACK resource reserved for the first antenna.

10. The apparatus of claim 9, wherein the uplink control channel is a physical uplink control channel in a communication system for Long Term Evolution or Long Term Evolution Advanced.

11. The apparatus of claim 9, wherein the downlink control channel is a physical downlink control channel in a communication system for Long Term Evolution or Long Term Evolution Advanced.

12. A method comprising:
using multiple input multiple output transmission;
receiving a channel allocation on a downlink control channel for a downlink channel and reservation information for uplink ACK/NACK transmissions,
wherein an aggregation of one or more control channel elements is reserved for the transmission on the downlink control channel; and
transmitting the uplink ACK/NACK transmissions on an uplink control channel,
wherein one uplink ACK/NACK transmission utilizes the control channel index corresponding to the one control channel element,
wherein another uplink acknowledgement utilizes the control channel index corresponding to the control channel element following the one control channel element, and wherein, for the uplink ACK/NACK transmission on the uplink control channel, resources are derived comprising:
a first ACK/NACK resource indexed by the lowest downlink control channel element in which control data was received, and
a second ACK/NACK resource, and
a system parameter configured by higher layer; and
wherein one of the first ACK/NACK resource or the at least second ACK/NACK resource is reserved for the uplink ACK/NACK transmission for a first antenna, and another one of the first ACK/NACK resource or the at least second ACK/NACK resource is reserved for the uplink ACK/NACK transmission for a second antenna, and where the one of the first or second ACK/NACK resource reserved for the second antenna is derived from the other of the first or second ACK/NACK resource reserved for the first antenna.

13. The method of claim 12, wherein the uplink control channel is a physical uplink control channel in a communication system for Long Term Evolution or Long Term Evolution Advanced.

14. The method of claim 12, wherein the downlink control channel is a physical downlink control channel in a communication system for Long Term Evolution or Long Term Evolution Advanced.

15. A computer program product embodied on a non-transitory computer-readable memory storing a program of instructions executable by a computer processor to perform or control the following:
transmitting on a downlink control channel to a user equipment using multiple input multiple output transmission a channel allocation for a downlink channel and reservation information for uplink ACK/NACK transmissions,
wherein an aggregation of one or more control channel elements is reserved for the transmission on the downlink control channel; and
wherein the channel allocation and the reservation information are transmitted such that one control channel element is not followed by a control channel element containing at least a part of an uplink ACK/NACK transmission for any other user equipment, and
wherein, for the uplink ACK/NACK transmission on the uplink control channel, resources are reserved comprising:
a first ACK/NACK resource indexed by the lowest downlink control channel element in which control data was received, and
a second ACK/NACK channel, and
a system parameter configured by higher layer; and
wherein one of the first ACK/NACK resource or the second ACK/NACK resource is reserved for the uplink ACK/NACK transmission for a first antenna of the user equipment, and another one of the first ACK/NACK resource or the second ACK/NACK resource is reserved for the uplink ACK/NACK transmission for a second antenna of the user equipment, and where the one of the first or second ACK/NACK resource reserved for the second antenna is derived from the other of the first or second ACK/NACK resource being reserved for the first antenna.

16. A computer program product embodied on a non-transitory computer-readable memory storing a program of instructions executable by a computer processor to perform or control the following:
using multiple input multiple output transmission;
receiving a channel allocation on a downlink control channel for a downlink channel and reservation information for uplink ACK/NACK transmissions,
wherein an aggregation of one or more control channel elements is reserved for the transmission on the downlink control channel; and
transmitting the uplink ACK/NACK transmissions on an uplink control channel,
wherein one uplink ACK/NACK transmission utilizes the control channel index corresponding to the one control channel element,
wherein another uplink acknowledgement utilizes the control channel index corresponding to the control channel element following the one control channel element, and
wherein, for the uplink ACK/NACK transmission on the uplink control channel, resources are derived comprising:
a first ACK/NACK resource indexed by the lowest downlink control channel element in which control data was received, and
at least a second ACK/NACK channel, and
a system parameter configured by higher layer; and
wherein one of the first ACK/NACK resource or the at least second ACK/NACK resource is reserved for the uplink ACK/NACK transmission for a first antenna, and another one of the first ACK/NACK resource or the at least second ACK/NACK resource is reserved for the uplink ACK/NACK transmission for a second antenna, and where the one of the first or second ACK/NACK resource reserved for the second antenna is derived from the other of the first or second ACK/NACK resource being reserved for the first antenna.

* * * * *